United States Patent Office 3,770,825
Patented Nov. 6, 1973

3,770,825
2-SUBSTITUTED AMINO CYCLOALKYL-
CARBOXAMIDES
William Taub and Moshe Avramoff, Rehovot, Israel, assignors to Yeda Research and Development Co., Ltd., Rehovot, Israel
No Drawing. Continuation-in-part of abandoned application Ser. No. 768,172, Oct. 16, 1968. This application Dec. 7, 1970, Ser. No. 95,950
Int. Cl. C07c 103/86
U.S. Cl. 260—557 B                 5 Claims

ABSTRACT OF THE DISCLOSURE

There is provided a novel class of anti-inflammatory agents consisting of 2-cycloalkylaminocycloalkanecarboxy derivatives and methods of preparing the same. The cycloalkyl moieties in these novel compounds are those having a principal ring size of 6 to 10 carbon atoms and optionally having bridgehead carbon atoms bonded across the cyclic nucleus.

---

This is a continuation-in-part application of application Ser. No. 768,172, filed Oct. 16, 1968, now abandoned.

FIELD OF THE INVENTION

Novel anti-inflammatory agents.

DESCRIPTION OF THE PRIOR ART

Heretofore it has been found that flufenamic acid and mefenamic acids are useful as highly potent anti-inflammatory agents. However these agents are metabolized rather rapidly in mammalian metabolic systems and thus eliminated therefrom in too short a time. It was therefore found desirable to seek compounds which would maintain the high activity of these acids while being relatively free from the disadvantage of rapid metabolic elimination.

SUMMARY OF THE INVENTION

The novel anti-inflammatory compounds of the present invention have the following structural formula Formula I wherein R is hydroxy, alkoxy, NR′R″, or NR′—NR″·R‴ where R′, R″ and R‴ may be hydrogen, alkyl, hydroxyl, alkoxy or aryl.
$Z_1, Z_2, Z_3$ and $Z_4$ are hydrogen or alkyl having 1–4 carbon atoms.
T and Q may be lower alkylene or alkyl substituted lower alkylene.
$d, f, g, n, k, q$ may be 0, 1, 2 or 3 provided that $d+f+g \leqslant 6 \geqslant q+n+k$.

It is also within the contemplation of the present invention that the alicyclic moieties of Formula I shown above may be substituted by one or more substituent groups, such as lower alkyl and halo lower alkyl, most suitably methyl or trifluoromethyl.

The beta amino acid derivatives of the present invention are prepared by condensing alicyclic beta ketoesters with alicyclic primary amines in the presence of an acid catalyst. The enamino esters thus obtained are hydrogenated to the corresponding saturated beta amino esters which may be subsequently transformed into the desired acid derivatives such as amides, hydrazides, hydroxamic acids and the like, by standard methods. For example, the ester may be treated with ammonia in the presence of a basic catalyst.

For example:

A somewhat simpler method may be employed where the two cyclic moieties are the same, referred to below as Ψ-symmetrical compounds. In this method the corresponding alicyclic ketone is condensed by heating with urea at elevated temperatures in the presence of triethanolimine, using the method of McKay et al. [J. Org. Chem., 26 76(1961)]. The enimines thus produced are then hydrogenated to yield the desired saturated beta amino acid amides.

For example:

DESCRIPTION OF THE PREFERRED EMBODIMENTS

The preferred embodiments of the present invention may be represented by the following structural formula which is subgeneric to Formula I Formula II wherein R, $Z_1$ and $n$ are as in Formula I
T is methylene
Q is methylene or isopropylene
$b, d$ and $m$ are 0 or 1
provided that where $d$ is 0, $b$ is 0; where $n$ is 2, $m$ is 0; where $n$ is 1 and $m$ is 1, Q is —CH₂— only; where $n$ is 0 and $m$ is 1, Q is CH₃·C·CH₃ and $Z_1$ is CH₃ only; and where $d$ and $n$ are 1, R is NH₂, NH·NH₂, or hydroxy.

It will be noted that the compounds of Formula II fall into two broad categories, those wherein the alicyclic moieties attached to the secondary (bridge) amino group are the same, i.e. Ψ-symmetrical compounds and those where the alicyclic groups are different, i.e. unsymetrical compounds.

In the first category the preferred alicyclic moieties are cyclohexyl, cycloheptyl and bicyclo[3,2,1]octyl.

The alicyclic groups utilized in the Ψ-symmetrical modifications may also be used in the unsymmetrical modifications. Additionally, the cyclic moiety which does not bear the carboxy group may be bornyl. Especially preferred among the unsymmetrical modifications are cyclohexyl and cycloheptyl bearing the carboxy moiety and cyclohexyl, and bornyl as the other cyclic moiety, although cyclooctyl may also be thus utilized.

In the preferred modification of the process of preparing the unsymmetrical compounds of the present invention, a solution of the appropriate beta ketoester and the appropriate cycloalkylamine is prepared in a water-azeotroping solvent such as benzene or toluene and heated in the presence of an acid catalyst. Any strong acid may be utilized; however p-toluene sulfonic acid is especially preferred. The reaction mixture is then heated under reflux for from about 1 to about 4 hours, most suitably for about two hours, until no further water is found in a Dean-Stark trap, attached to the apparatus. The solvent is then removed, suitably by distillation under reduced pressure, and the residue distilled under high vacuum, to give the corresponding bicyclic enamino ester.

The enamino ester is then reduced, most suitably by catalytic hydrogenation. Any of the more common noble metal catalysts such as platinum, palladium, and the like may be utilized. Especially preferred however is Adams catalyst (platinum oxide). The hydrogenation is most suitably carried out by dissolving the enamino ester in glacial acetic acid and hydrogenating in the presence of the catalyst at ambient temperature and slightly elevated pressure, that is to say between 10 and 50, suitably about 30 p.s.i. pressure.

Upon absorption of the theoretical amount of hydrogen, the hydrogenation is ended and the hydrogenation mixture separated from the catalyst, suitably by filtration. The solvent is then removed, suitably by evaporation under reduced pressure and the residue distilled under high vacuum.

Where it is desired to convert the thus produced saturated beta amino ester to the corresponding amide, the ester may be heated under pressure in an autoclave with ammonia in the presence of a basic catalyst or treated similarly with methanolic ammonia at room temperature and pressure for several days, and the residue washed with water and extracted with a water immiscible solvent such as ether. The ether extract is then worked up in the usual manner to yield the desired carboxamide.

Where it is desired to produce a Ψ-symmetrical beta amino carboxamide the appropriate cyclic ketone is heated with urea at between about 150° C. to about 200° C. in the presence of triethanolamine. Heating is carried on for from about 4 to about 10 hours. Upon cooling the solidified reaction mixture is extracted successively, optionally with hot benzene, and then with hot water, and finally with hot alkanol, suitably ethanol. Upon dilution with water, the desired beta enamino carboxamide is precipitated from the alcoholic solution.

The thus produced enamino carboxamide is then reduced to the corresponding amino carboxamide in a manner similar to that described above for the reduction of beta enamino carboxylic esters. However it has been found preferable to use as a solvent absolute ethanol containing one equivalent of concentrated hydrochloric acid rather than a glacial acetic acid. The desired product is isolated from the reduction solution in the usual manner.

Where it is desired to produce the corresponding amino carboxylic acid (most suitably as an acid salt) the corresponding carboxamide is heated under reflux in concentrated mineral acid solution, most suitably concentrated hydrochloric acid, for example, having a strength of approximately 18%. The desired carboxylic acid may then be isolated in the usual manner.

The compounds produced in accordance with the present invention show anti-inflammatory activity. For example, activity by the oral route in rats has been established at dosages from 50 to 100 mg. per kg. and higher. It will vary from compound to compound, moreover, in clinical practice, it is, of course, advisable to adjust dosage in light of individual recipient response.

The compounds may be administered to mammals requiring treatment of inflammation in any of the modes known to the art. The compounds may be administered, most suitably in the presence of carriers, orally, rectally, parentarily or topically. It is preferred for purposes of administration that the compounds of the present invention be formulated with suitable carriers in the form of tablets, capsules (liquid-filled or dry-filled), sterile injectible solutions, syrups, jellies, elixirs, suspensions, ointments, powders, suppositories, and the like. Suitable carriers include sugars such as lactose and sucrose; gelatin; talc; cellulose, methylcellulose, cellulose acetate phthalate; vegetable oils such as cottonseed oil, olive oil, corn oil, peanut oil and the like; polyethylene glycol; ethanol; agar; isotonic saline; and the like.

It is to be further understood that the compounds of the present invention have been found to be substantially nontoxic in standard laboratory test animals. It is also to be understood that the dosage amounts and dosage forms should be determined by the treating clinician.

EXAMPLE 1

2-cycloheptylidenaminocycloheptene-1-carboxamide

A mixture of 51 g. of cycloheptanone, 10.8 of urea and 1.8 ml. of triethanolamine is refluxed with stirring for 1 hr., cooled and, after adding an additional amount of 10.8 g. of urea, heated at 180° C. to 200° C. for the same period of time. The cold reaction mixture is dissolved in 60 ml. of ethanol and water is added until the mixture becomes cloudy. The precipitate forms overnight. It is filtered, washed with a small amount of 50% cold ethanol, with 400 ml. of boiling water and dried in a vacuum desiccator to yield 2-cycloheptylidenaminocycloheptene carboxamide (27.0 g.), M.P. 183–5° (evac. cap.).

Analysis.—Calcd. for $C_{15}H_{24}N_2O$ (percent): C, 72.54; H, 9.74; N, 11.28. Found (percent): C, 72.46; H, 9.90; N, 11.32.

EXAMPLE 2

2-cycloheptylaminocycloheptane carboxamide

A solution of 14.2 g. of 2-cycloheptylidenaminocycloheptene-1-carboxamide in 100 ml. of glacial acetic acid and in the presence of 700 mg. of Adam's catalyst is hydrogenated at room temperature at 30 p.s.i. pressure for 16 hours. The residue obtained after evaporation of the filtered solution is dissolved in a mixture of ether and 3 N ammonia solution, and the basic aqueous solution is extracted with ether. The combined organic solutions are washed with a saturated sodium chloride solution, dried, and the residue, obtained after the evaporation of the solvent, is treated with pentane to yield 2-cycloheptylaminocycloheptane carboxamide (10.7 g.), M.P. 67–68°.

Analysis.—Calcd. for $C_{15}H_{28}N_2O$ (percent): C, 71.38; H, 11.18; N, 11.10. Found (percent): C, 71.30; H, 10.91; N, 11.15.

EXAMPLE 3

2-[2-bicyclo(3,2,1)octylidenamino]bicyclo[3,2,1]oct-2-ene-3-carboxamide

A mixture of 12.4 g. of bicyclo[3,2,1]octanone-2, 6.0 g. of urea and 0.5 g. of triethanolamine is heated with stirring and reflux condenser at 200° for six hours. The solidified reaction mixture is washed with hot benzene, with hot water and then with 200 cc. hot ethanol. The alcohol solution affords, after dilution with an equal volume of water 2[2-bicyclo(3,2,1)octylidenamino]bicyclo[3,2,1]oct-2-ene-3-carboxamide (8.7 g.), M.P. 276–279° (evac. capil.).

Analysis.—Calcd. for $C_{17}H_{24}N_2O$ (percent): C, 74.96; H, 8.88; N, 10.29. Found (percent): C, 74.71; H, 8.76; N, 10.43.

EXAMPLE 4

2-[2-bicyclo(3,2,1)octylamino]bicyclo(3,2,1)octane-3-carboxamide

A solution of 7.8 g. of 2[2 - bicyclo(3,2,1)octylidenamino]bicyclo[3,2,1]oct-2-ene-3-carboxamide in 400 ml. of abs. ethanol and 2.7 ml. of conc. HCl., containing 300 mg. of Adam's catalyst is hydrogenated at room temperature and 30 p.s.i. The theoretical amount of hydrogen is absorbed over a period of 5 hrs. The residue, obtained after evaporation of the filtered alcoholic solution, is dissolved in water, made alkaline with sodium carbonate and extracted with ether. The residue from the ethereal solution is crystallized from hexane to yield 2-[2-bicyclo(3,2,1)octylamino]bicyclo(3,2,1)octane - 3-carboxamide (5.6 g.), M.P. 100–102°.

*Analysis.*—Calcd. for $C_{17}H_{28}N_2O$ (percent): C, 73.86; H, 10.21. Found (percent): C, 73.57; H, 10.27.

EXAMPLE 5

Ethyl 2-cycloheptylaminocyclohexene carboxylate

A solution of 17.0 g. of 2-carbethoxycyclohexanone, 12.4 g. of cycloheptylamine and 0.20 g. of p-toluenesulfonic acid in 100 ml. of dry toluene is refluxed for 4 hours, the evolved water being collected in a Dean-Stark trap. The cooled solution is washed with aqueous sodium carbonate and dried. The residue left after the evaporation of the solvent is distilled to yield ethyl 2-cycloheptylaminocyclohexene carboxylate (18.0 g.), B.P. 136°/0.5 mm.

*Analysis.*—Calcd. for $C_{16}H_{27}NO_2$ (percent): C, 72.41; H, 10.26; N, 5.28. Found (percent): C, 72.45; H, 10.01; N, 5.10.

In accordance with the above procedure but starting with cyclooctylamine in place of cycloheptylamine, and 2 - carbethoxycycloheptanone in place of 2-carbethoxycyclohexanone there is obtained ethyl 2-cyclo octylaminocycloheptene carboxylate.

EXAMPLE 6

Ethyl 2-cycloheptylaminocyclohexane carboxylate hydrochloride

A solution of 16.0 g. of ethyl 2-cycloheptylaminocyclohexene carboxylate in 60 ml. of glacial acetic acid, in the presence of 0.80 g. prehydrogenated Adam's catalyst, is hydrogenated at room temperature and 30 p.s.i. pressure for 6 hrs. The residue obtained by concentration of the filtered solution is dissolved in ether, washed with normal sodium hydroxide solution, with water and dried. The residue obtained after the evaporation of the solvent is distilled to yield ethyl 2 - cycloheptylaminocyclohexane carboxylate (9.5 g.), B.P. 114–116°/0.5 mm.

*Analysis.*—Calcd. for $C_{16}H_{29}NO_2$ (percent): C, 71.86; H, 10.93; N, 5.24. Found (percent): C, 72.23; H, 10.96; N, 5.24.

The hydrochloride, prepared in alcohol solution and precipitated by dry ether, melted at 200–201°.

*Analysis.*—Calcd. for $C_{16}H_{30}ClNO_2$ (percent): C, 63.24; H, 9.95; N, 4.61; Cl, 11.67. Found (percent): C, 63.26; H, 9.93; N, 4.77; C, 11.51.

In accordance with the above procedure, but starting with ethyl 2-cyclooctylaminocycloheptene carboxylate in place of ethyl 2-cycloheptylaminocyclohexene carboxylate, there is obtained ethyl 2 - cyclooctylaminocycloheptane carboxylate.

EXAMPLE 7

Ethyl 2-[2-bicyclo(3,2,1)octyl]aminocyclohex-1-ene-carboxylate

A solution of 8.3 g. of bicyclo(3,2,1)octylamine, 12.8 of 2-carbethoxycyclohexanone and 0.20 g. of p-toluenesulfonic acid in 100 ml. of dry benzene is refluxed for 2 hrs., the evolved water being collected in a Dean-Stark trap. The solvent is removed and the residue distilled to yield ethyl 2 - [2-bicyclo(3,2,1)octyl]aminocyclohex-1-ene-carboxylate.

In accordance with the foregoing procedure but in place of 2-carbethoxycyclohexanone there is 2-carbethoxycycloheptanone, thus there is obtained ethyl 2-[2-bicyclo(3,2,1)octyl]aminocyclohept-1-ene carboxylate.

EXAMPLE 8

Ethyl 2-[2-bicyclo(3,2,1)octyl]aminocyclohexane carboxylate

A solution of 16.2 of ethyl 2-[2-bicyclo(3,2,1)octyl]aminocyclohex - 1-ene carboxylate in 60 ml. of glacial acetic acid and in the presence of 600 mg. of Adam's catalyst is hydrogenated at room temperature and 30 p.s.i. pressure. The theoretical amount of hydrogen is absorbed over a period of one hour. The reaction mixture is diluted with ether and filtered. The residue obtained after the complete evaporation of the solvents is dissolved in ether in order to filter out a precipitated solid residue and then concentrated again and distilled to yield ethyl 2-[2-bicyclo(3,2,1)octyl]aminocyclohexane carboxylate.

In accordance with the foregoing procedure but in place of ethyl 2-[2-bicyclo(3,2,1)octyl]aminocyclohex - 1 - ene carboxylate there is used ethyl 2-[2-bicyclo(3,2,1-)octyl]aminocyclohept-1-ene carboxylate, thus there is obtained ethyl 2-[2-bicyclo(3,2,1)octyl]aminocycloheptane carboxylate.

EXAMPLE 9

2-cycloheptylaminocyclohexane carboxamide

A solution of 4.1 g. of ethyl 2-cycloheptylaminocyclohexane carboxylate in 24% methanolic ammonia containing 0.1 g. of sodium methoxide is left at room temperature for one month. The residue obtained after the evaporation of the solvent is dissolved in benzene and washed with water. The residue obtained after the evaporation of dried organic layer is triturated with hexane and then recrystallized from dilute ethanol to yield 2-cycloheptylaminocyclohexane carboxamide.

In accordance with the foregoing procedure by using, in place of ethyl 2-cycloheptylaminocyclohexane carboxylate, ethyl 2-cyclooctylaminocyclohexane carboxylate,
ethyl 2-[2-bicyclo(3,2,1-octyl]aminocyclohexane carboxylate,
ethyl 2-[2-bicyclo(3,2,1)octyl]aminocycloheptane carboxylate,
ethyl 2-[2-bicyclo(3,2,1)octyl]aminocyclooctane carboxylate, there is obtained 2-cyclooctylaminocyclohexane carboxamide
2-[2-bicyclo(3,2,1)octyl]aminocyclohexane carboxamide
2-[2-bicyclo(3,2,1)-octyl]aminocycloheptane carboxamide
2-[2-bicyclo(3,2,1)octyl]aminocyclooctane carboxamide, respectively.

EXAMPLE 10

Ethyl 2-cyclohexylaminocycloheptane carboxylate

A solution of 5.0 g. of cyclohexylamine, 9.2 g. of 2-carbethoxycycloheptanone and 0.10 g. of p-toluenesulfonic acid in 50 ml. of dry benzene is refluxed for 24 hrs. under nitrogen, the evolved water being collected in a Dean-Stark trap. The solvent is removed and the residue distilled to yield 8.0 g. ethyl 2-cyclohexylaminocyclohept-1-ene-carboxylate, B.P. 140–144°/0.5 mm.

Calcd. for $C_{16}H_{27}O_2N$ (percent): C, 72.41; H, 10.26. Found (percent): C, 72.86; H, 10.26.

A solution of 21.0 g. of ethyl 2-cyclohexylaminocyclohept-1-ene carboxylate in 120 ml. of glacial acetic acid and in the presence of 1 g. of Adam's catalyst is hydrogenated at room temperature and 30 p.s.i. pressure. The theoretical amount of hydrogen is absorbed over a period of 16 hours. The reaction mixture is filtered. The residue obtained after the complete evaporation of the solvents is dissolved in ether, washed with dilute aqueous sodium hydroxide and saturated aqueous sodium chloride, dried and then concentrated again and distilled to yield 12.1 g. of ethyl 2-cyclohexylaminocycloheptane carboxylate, B.P. 128°/0.4 mm.

Calcd. for $C_{16}H_{29}O_2N$ (percent): C, 71.86; H, 10.93; N, 5.24. Found (percent): C, 72.08; H, 10.65; N, 5.40.

In accordance with the above procedure but in place of 2-carbethoxycycloheptanone using 3-carbethoxy[2-bicyclo(3,2,1)octanone], and similarly but in place of cyclohexylamine using cycloheptylamine and cyclooctylamine together with 3-carbethoxy[2-bicyclo(3,2,1)octanone], and similarly in place of cyclohexylamine using cyclooctylamine with 2-carbethoxycycloheptanone, there is obtained ethyl 2-cyclohexylamino[2-bicyclo(3,2,1)octane]-3-carboxylate.

ethyl 2-cycloheptylamino[2-bicyclo(3,2,1)octane]-3-carboxylate,
ethyl 2-cyclooctylamino[2-bicyclo(3,2,1)octane]-3-carboxylate,
ethyl 2-cyclooctylaminocycloheptane carboxylate.

EXAMPLE 11

2-cyclohexylaminocycloheptane carboxamide

A solution of 4.1 g. of ethyl 2-cyclohexylaminocycloheptane carboxylate in 24% methanolic ammonia containing 0.1 g. of sodium methoxide is left at room temperature for one month. The residue obtained after the evaporation of the solvent is dissolved in benzene and washed with water. The residue obtained after the evaporation of dried organic layer is triturated with hexane and then recrystallized from dilute ethanol to yield 1.4 g. of 2-cyclohexylaminocycloheptane carboxamide, M.P. 79–81°

Analysis.—Calcd. for $C_{14}H_{26}ON_2$ (percent): C, 70.54; H, 10.99; N, 11.75. Found (percent): C, 70.38; H, 10.82; N, 11.50.

In accordance with the foregoing procedure but using in place of ethyl 2-cyclohexylaminocycloheptane carboxylate, ethyl 2-cyclohexylamino[2-bicyclo(3,2,1)octane]-3-carboxylate,
ethyl 2-cycloheptylamino[2-bicyclo(3,2,1)octane]-3-carboxylate,
ethyl 2-cyclooctylamino[2-bicyclo(3,2,1)octane]-3-carboxylate,
ethyl 2-cyclooctylaminocycloheptane carboxylate, there is obtained 2-cyclohexylamino[2-bicyclo(3,2,1)octane]-3-carboxamide,
2-cycloheptylamino[2-bicyclo(3,2,1)octane]-3-carboxamide,
2-cyclooctylamino[2-bicyclo(3,2,1)octane]-3-carboxamide,
2-cyclooctylaminocycloheptane carboxamide.

EXAMPLE 12

Ethyl 2-bornylaminocycloheptane carboxylate

A solution of 15.3 g. of bornylamine, 18.4 g. of 2-carbethoxycycloheptanone and 0.20 g. of p-toluenesulfonic acid in 100 ml. of dry benzene is refluxed for 20 hrs., the evolved water being collected in a Dean-Stark trap. The solvent is removed and the residue distilled to yield 25 g. of ethyl 2-bornylaminocyclohept-1-ene-carboxylate, B.P. 147–157° C./0.5 mm.

A solution of 20.5 g. of ethyl 2-bornylaminocyclohept-1-ene carboxylate in 100 ml. of glacial acetic acid and in the presence of 800 mg. of Adam's catalyst is hydrogenated at room temperature and 45 p.s.i. pressure. The theoretical amount of hydrogen is absorbed over a period of 24 hours. The reaction mixture is filtered. The residue obtained after the complete evaporation of the solvents is dissolved in ether washed with dilute aqueous sodium hydroxide, saturated sodium chloride and dried over sodium sulfate, then concentrated again. The residue is chromatographed on neutral alumina. Elution with hexane-benzene (6:1) followed by evaporation and distillation yields 16 g. of ethyl 2-bornylaminocycloheptane carboxylate, B.P. 144–146°/0.5 mm.

Analysis.—Calcd. for $C_{20}H_{35}O_2N$ (percent): C, 74.71; H, 10.97; N, 4.63. Found (percent): C, 74.56; H, 10.74; N, 4.35.

In accordance with the foregoing procedure but in place of 2-carbethoxycycloheptanone there is 2-carbethoxycyclohexanone, there is obtained ethyl 2-bornylaminocyclohexane carboxylate.

EXAMPLE 13

2-bornylaminocycloheptane carboxamide

A solution of 4.1 g. of ethyl 2-bornylaminocycloheptane carboxylate in 24% methanolic ammonia containing 0.1 g. of sodium methoxide is left at room temperature for one month. The residue obtained after the evaporation of the solvent is dissolved in benzene and washed with water. The residue obtained after the evaporation of dried organic layer is triturated with hexane and then recrystallized from dilute ethanol to yield 2-bornylaminocycloheptane carboxamide.

In accordance with the above procedure but starting, in place of ethyl 2 - bornylaminocycloheptane carboxamide, with ethyl 2 - bornylaminocyclohexane carboxylate, there is obtained 2-bornylaminocyclohexane carboxamide.

EXAMPLE 14

2-cycloheptylaminocyclohexane carboxylic acid hydrochloride

A solution of 4.0 g. of ethyl 2-cycloheptylaminocyclohexane carboxylate hydrochloride or of the free amino ester in 80 ml. of conc. HCl was refluxed for 7 hours. The residue obtained by evaporation of the solvent was dried over NaOH and then recrystallized from isopropanol to yield 2-cycloheptylaminocyclohexane carboxylic acid hydrochloride (2.64 g.), M.P. 209–210°.

Analysis.—Calcd. for $C_{14}H_{26}ClNO_2$ (percent): C, 60.96; H, 9.50; N, 5.08; Cl, 12.86. Found (percent): C, 60.82; H, 9.54; N, 5.10; Cl, 13.19.

In accordance with the above procedure but using the appropriate carboxamide or carboxylate, there is obtained 2-bornylaminocyclohexane carboxylic acid hydrochloride.

EXAMPLE 15

Methyl 2-cycloheptylaminocycloheptane carboxylate

The solution of 5.8 g. of 2-cycloheptylaminocycloheptane carboxamide in 60 ml. of absolute methanol is saturated with hydrogen chloride, left at room temperature for 48 hours and then refluxed for 8 hours. The residue obtained after evaporation of the solvent is made alkaline with aqueous sodium hydroxide solution and then extracted several times with benzene. The residue obtained after evaporation of the dried organic layer is submitted to distillation to yield 4.0 g. of methyl 2- cycloheptylaminocycloheptane carboxylate, B.P. 118°/0.3 mm. mercury.

*Analysis.*—Calcd. for $C_{16}H_{29}O_2N$ (percent): C, 71.86; H, 10.93; N, 5.24. Found (percent): C, 71.50; H, 10.83; N, 5.04.

EXAMPLE 16

2-cycloheptylaminocycloheptane carboxllic acid hydrazide

A solution of 8.0 g. methyl 2-cycloheptylaminocycloheptane carboxylate and 4.0 ml. of anhydrous hydrazine in 4 ml. of isopropanol is refluxed for 18 hours. The solvent and excess hydrazine are evaporated in vacuo. The residue is dissolved in ethyl acetate and washed with water. The residue obtained by evaporation of the dried organic layer is recrystallized from a small amount of ethyl acetate and then from hexane to yield 3.1 g. of 2-cycloheptylaminocycloheptane carboxylic acid hydrazide, M.P. 69–71°.

*Analysis.*—Calcd. for $C_{15}H_{29}ON_3$ (percent): C, 67.37; H, 10.93; N, 15.72. Found (percent): C, 67.57; H, 10.86; N, 15.94.

EXAMPLE 17

The anti-inflammatory agents of this invention were evaluated as follows. Male white rats were separated into two groups. One group was given the compound of this invention orally as an emulsion with tragacanth at a dosage of 200 mg./kg. After 1 hour, edema was induced in all of the rats by injecting 100 mg. of a carrageenin solution subcutaneously into the left paw. 2 hours after the injection, the animals were sacrificed, both feet were amputated in the tarsocrural joint and the difference in weight between the injected left paw (minus 100 mg. of injected solution) and the normal right paw was considered representative for the intensity of the edema. The mean weight gain of the rats' paws in the control group and in the group treated with the anti-inflammatory agents were determined. The percentage difference in the mean weight of the treated rats relative to the untreated rats indicates the anti-inflammatory properties of the compounds.

The percentage difference found when the rats were treated with 2-cycloheptylaminocycloheptane carboxylic acid hydrazide of Example 16 was 71%.

The percentage difference when the 2-cycloheptylaminocyclohexane carboxylic acid hydrochloride of Example 14 was administered to the rats was 30%.

EXAMPLE 18

The anti-inflammatory properties of additional compounds of this invention were evaluated following the procedure described in Example 17. The compounds administered and the dosage administered together with the resulting percentage difference is set forth in the following table. In two evaluations, the carrageenin solution was replaced by a formalin solution.

| Compound | Dosage, mg./kg. | Carrageenin edema Mean weight of edema, mg. Treated | Control | Percent difference |
|---|---|---|---|---|
| 2-cycloheptylaminocycloheptane-1-carboxamide (of Example 2) | 150 | 132 | 342 | 61 |
| 2-bornylaminocyclohexane carboxylic acid hydrochloride (of Example 14) | 500 | 203 | 348 | 42 |
| 2-[2-bicyclo(3-2-1)octylamino]bicyclo(3,2,1)octane-3-carboxamide (of Example 4) | 50 | 186 | 303 | 39 |
| Ethyl 2-bornylaminocycloheptane carboxylate (of Example 12) | 100 | 220 | 268 | 18 |
| | | Formalin edema | | |
| 2-cycloheptylaminocycloheptane-1-carboxamide (of Example 2) | 150 | 124 | 220 | 44 |
| 2-bornylaminocyclohexane carboxylic acid hydrochloride (of Example 14) | 500 | 138 | 220 | 37 |

The embodiments of the invention in which an exclusive privilege or property is claimed are defined as follows:

1. A compound having the following structural formula

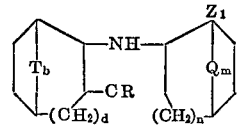

and the hydrochlorides thereof, wherein

R is $NH_2$,
T is $-CH_2-$,
Q is $-CH_2-$ or $CH_3 \cdot C \cdot CH_3$ and
$Z_1$ is H or $CH_3$;
$b$, $d$, and $m$ are each 1 or 0 and $n$ is 2, 1 or 0; provided that
where $d$ is 0, $b$ is 0; where $n$ is 2, $m$ is 0; where $n$ is 1 and $m$ is 1, Q is $-CH_2-$ only; and where $n$ is 0 and $m$ is 1, Q is $CH_3 \cdot C \cdot CH_3$ and $Z_1$ is $CH_3$ only.

2. 2-cycloheptylaminocycloheptane carboxamide in accordance with claim 1.

3. 2-[2 - bicyclo(3,2,1)octylamino]bicyclo(3,2,1)-octane-3-carboxamide in accordance with claim 1.

4. 2-cycloheptylaminocyclohexane carboxamide in accordance with claim 1.

5. 2-bornylaminocycloheptane carboxamide in accordance with claim 1.

References Cited
UNITED STATES PATENTS
3,492,330   1/1970   Trecker et al. _____ 260—557

HARRY I. MOATZ, Primary Examiner

U.S. Cl. X.R.
260—468 R, 468 B, 557 B; 424—324

PO-1050
(5/69)

UNITED STATES PATENT OFFICE
CERTIFICATE OF CORRECTION

Patent No. 3,770,825      Dated November 6, 1973

Inventor(s) William Taub et al

It is certified that error appears in the above-identified patent and that said Letters Patent are hereby corrected as shown below:

Column 9, line 8, for "carboxllic" read: - - carboxylic - -.

Column 10, in the formula of claim 1 appearing at lines 25-30, for the moiety "-C R" read: - -   -COR  - -.

Signed and sealed this 23rd day of April 1974.

(SEAL)
Attest:

EDWARD M. FLETCHER, JR.
Attesting Officer

C. MARSHALL DANN
Commissioner of Patents